United States Patent
Grey

[11] 3,848,967
[45] Nov. 19, 1974

[54] COMPACT SEVEN ELEMENT ZOOM LENS WITH OPTICAL COMPENSATION

[75] Inventor: David S. Grey, Lexington, Mass.

[73] Assignee: Polaroid Corporation, Cambridge, Mass.

[22] Filed: Dec. 26, 1972

[21] Appl. No.: 318,224

[52] U.S. Cl. ............................. 350/184, 350/214
[51] Int. Cl. ............................................ G02b 15/14
[58] Field of Search ............................ 350/184, 186

[56] References Cited
UNITED STATES PATENTS

| | | | |
|---|---|---|---|
| 2,718,817 | 9/1955 | Back et al. | 350/184 |
| 3,294,471 | 12/1966 | Back | 350/184 |

*Primary Examiner*—John K. Corbin
*Attorney, Agent, or Firm*—Frederick H. Brustman

[57] ABSTRACT

A compact optically compensated zoom lens is described. It comprises a zoom group of four lens elements followed by an objective group of three lens elements. The zoom group, contrary to the common prior practice, is not afocal and thus directs a convergent bundle of light rays into the objective group. This novel arrangement promotes compactness and improved corrections for aberrations otherwise present in a compact seven element zoom lens. Optical compensation of the zoom group, by the negative third element in particular, retains the zoom lens' focal plane a predetermined distance behind the last lens element during zooming. One specie is presented.

14 Claims, 2 Drawing Figures

| ELEMENT | $n_d$ | $\nu$ | RADIUS | THICKNESS | SEPARATION |
|---|---|---|---|---|---|
| I neg. | 1.765 | 27.1 | $R_1$ = 1.216<br>$R_2$ = .802 | $t_1$ = 0.100 | $S_1$ = 1.009 |
| II pos. | 1.654 | 57.9 | $R_3$ = .912<br>$R_4$ = 6.033 | $t_2$ = 0.182 | $S_2$ = 0.030 |
| III neg. | 1.668 | 57.1 | $R_5$ = 57.009<br>$R_6$ = .840 | $t_3$ = 0.101 | $S_3$ = 0.725 |
| IV pos. | 1.480 | 70.4 | $R_7$ = 70.562<br>$R_8$ = -1.380 | $t_4$ = 0.138 | $S_4$ = 0.243 |
| V pos. | 1.691 | 54.7 | $R_9$ = .676<br>$R_{10}$ = -6.418 | $t_5$ = 0.318 | $S_5$ = 0.113 |
| VI neg. | 1.753 | 27.6 | $R_{11}$ = -.604<br>$R_{12}$ = .867 | $t_6$ = 0.216 | $S_6$ = 0.020 |
| VII pos. | 1.691 | 54.7 | $R_{13}$ = -4.953<br>$R_{14}$ = -.510 | $t_7$ = 0.080 | $S_7$ = 0.736 |

3,848,967

COMPACT SEVEN ELEMENT ZOOM LENS WITH OPTICAL COMPENSATION

BACKGROUND OF THE INVENTION

The present invention concerns the construction of an improved variable focal length objective lens of the type whose focal plane remains stationary or moves only within the limits defined by the objective lens' depth of focus as its focal length changes. Such variable focal length objectives are usually referred to as zoom lenses. Zoom lenses fall into one of two broad classes according to the compensating means employed for keeping the focal plane stationary while the focal length changes. The two classes are mechanical compensation to prevent focal plane shift and optical compensation to prevent it.

This invention relates to the class of optically compensated zoom lenses as does the invention disclosed in my copending patent application Ser. No. 318,226, filed Dec. 26, 1972, whereas the invention disclosed in my copending patent application Ser. No. 318,225, also filed Dec. 26, 1972, relates to the class of mechanically compenated zoom lenses. Optically compenated zoom lenses have two or more lens components that move axially relative to other lens components to change the focal length of the entire zoom lens. One or more of the stationary lens components are situated between the moving lens components to provide the required compensation to hold the focal plane stationary. The movable lens components will move together at the same rate with respect to the fixed components of the zoom lens as they move (zoom) to change the focal length. Optical compensation for focal plane shift during zoom complicates the optical design of the zoom lens, but it greatly simplifies the design and construction of the lens' cell.

Conventional zoom lenses are generally designed in two separate parts to be used together. The front part is an afocal telescope of variable power, and the rear part is an objective lens of fixed power. An afocal telescope forms an image of a distant object at infinity. One reason for this common arrangement is that the objective is corrected for objects at infinity and, therefore, can employ a variety of different afocal telescope front parts or it can function alone as a normal (non-zoom) objective.

To retain the image formed by the zoom lens in a fixed focal plane for all object distances requires that the image formed by the first lens component always occupies the same position in space. Achieving this condition requires movement of the first lens component to focus the zoom lens in addition to any movement that lens might have for focal length variation. However, moving the first lens component only for focusing and not for zooming simplifies the mechanical and optical design of the zoom lens.

An object of the present invention is a compact well-corrected seven element zoom lens with an overall length less than four times its shortest focal length.

Another object of the present invention is a compact zoom lens with optical compensation for maintaining its focal plane stationary as its focal length varies.

Yet another object of the present invention is a compact zoom lens comprising a variable power telescope section for forming a stationary image at a finite conjugate and a fixed power objective lens section optically corrected for forming, at a finite conjugate, a real image of the stationary image.

SUMMARY OF THE INVENTION

These and other objects of the invention are accomplished by a seven element optically compensated zoom lens. It comprises a four lens element zoom group and a three lens element objective group.

The zoom group forms a real image of a subject a finite distance to its rear, thereby providing convergent light to the objective group. The first lens component of the zoom group remains stationary during zooming. By itself it forms a virtual image of the subject and it moves, if at all, only to focus the real image formed by the zoom group as a whole. The positive second and fourth lens components move axially as a unit to vary the power of the zoom group. A relatively strong negative third lens element remains stationary between the positive second and fourth lens elements. The second and fourth lens elements increase the focal length of the zoom group as they approach the first lens component. This arrangement compensates for the focal plane shift otherwise experienced during zoom. A high Abbe number for the positive fourth lens component promotes achromatization of the zoom group even as the positive lenses move.

The objective group, comprising the fifth, sixth, and seventh lens elements, focuses the image formed by the zoom group onto the focal plane. It also contributes to the correction of aberrations remaining in that image to the benefit of the image formed at the focal plane.

It is important to note that the artificial constraint, common to the prior art, of having parallel light between the zoom and objective groups is avoided. Indeed, an important concept of this invention is that all the lens components are treated as an integrated optical system and are not artificially resolved into an afocal zoom group and an infinity focused objective group, each independent of the other. That terminology is used herein only as an aid to understanding the present invention for those familiar with the prior art.

When reading the present description, the following interrelation should be kept in mind as it helps to achieve a short zoom lens. It particularly applies to the zoom group. Strong lens elements permit shortening the zoom group. They achieve a given zoom ratio with smaller changes in the air spaces (less axial movement). Consequently, the overall size of the zoom group is less by the amount of the reduced movement. However, as the power and especially the curvature of the lens elements increases, correction of their aberrations becomes harder. Thus, a goal in designing lenses according to the present concept is to minimize air space changes and curvatures. Large refractive indices suffice for this, but the need to correct chromatic aberrations moderates this approach for one must think of achromatizing, in some manner, the several lens elements.

DESCRIPTION OF THE DRAWING

Other objects and many of the attendant advantages of the present invention will be better appreciated and said invention will become more clearly understood by reference to the following detailed description when considered in conjunction with the accompanying drawing illustrating one embodiment of the instant invention, wherein.

DESCRIPTION OF THE PREFERRED EMBODIMENT

Figures 1, 2:
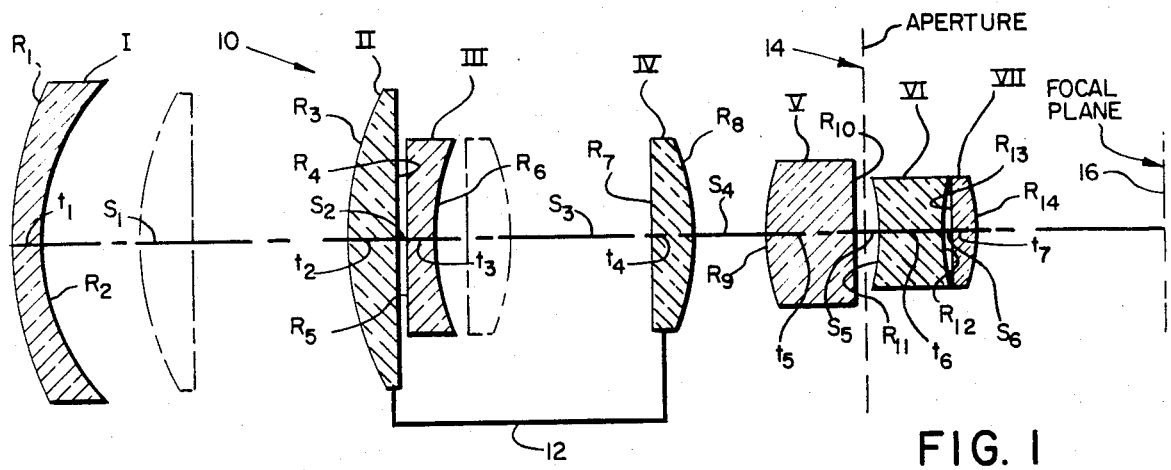
FIG. 1 illustrates a seven element optically compensated zoom lens according to the present invention.
FIG. 2 presents a tabulation of the numerical data necessary to construct the zoom lens illustrated in FIG. 1.

Refer to FIG. 1 illustrating one specie of the invention in conjunction with the following description. FIG. 1 illustrates a seven element optically compensated zoom lens 10 with its movable components II and IV arranged to yield the shortest focal length (wide angle configuration) of the zoom lens 10. Moving lenses II and IV leftward increases the focal length of the zoom lens 10. The maximum focal length (telephoto configuration) of the zoom lens 10 is achieved with the moving components in their leftwardmost position, indicated in FIG. 1 by the phantom lines.

The first lens element I focuses the zoom lens 10 on a subject at infinity. Certain changes in the design of the zoom lens would permit it to focus on subjects at finite conjugates by moving negative lens element I. Moving lens element I does not effect the focal length of the zoom lens 10 by comparison with the effect of moving lenses II and IV.

Lens element I should be strong but have little chromatic dispersion. A strong first lens element I would permit a useful focusing range to be achieved with a minimal change in the following air space $S_1$. Minimizing the change in the air space $S_1$ limits impairment of the zoom lens 10's corrections for optical aberrations otherwise associated with focusing. Optical strength, large dioptric powers, is preferably achieved by using relatively weak curvatures (long radii) and a large refractive index. Weak curvatures generally contribute less to the sum of the Seidel coefficients than strong curvatures contribute. The sum of the Seidel coefficients is a measure of the monochromatic aberrations in an optical system.

The material of lens element I should cause minimum chromatic dispersion (as associated with a large Abbe value, $\nu$) so a change in the air space $S_1$ does not unduly increase the chromatic aberrations in the final image. However, the largest Abbe values are not associated with the largest refractive indices. Thus, selecting a practical optical material for lens element I requires a compromise. The compromise should be weighted in favor of a larger refractive index because the resultant lessening of the change in air space $S_1$ and the weakening of the surface curvatures promotes the maintenance of the corrections for chromatic aberrations as well as the corrections for monochromatic aberrations.

The second and fourth lens elements, II and IV, respectively, move together as a unit. The solid line 12, joining lens elements II and IV, symbolizes the mechanical linkage joining them to insure equal linear movement.

The alternated arrangement of the zoom section, with the collective lens element II together between the dispersive lens elements I and III followed by the collective lens element IV, reduces the variation in focal position of the image formed by the zoom group as the focal length changes. The reduction in the focal position variation is achieved by the optical design and does not require differential movement of any lens element.

Changes in the separation (air space) between a dispersive negative lens III and a collective positive lens component (element II) cause specific changes in the net focal length of the combined lenses. However, the focal plane position varies too much as the focal length changes. Using a second collective lens IV, on the opposite side of the dispersive negative lens III from the collective lens component (element II) and moving it in tandem with the latter will yield a fair approximation to a constant focal plane position. The variation in focal plane position of the foregoing arrangement can be kept within a practical tolerance of depth of focus by the optical design without resorting to differential air space changes.

Adding another negative lens component to the preceding arrangement can reduce the focal plane variation remaining in the necessary arrangement. In this instance, the added negative component, the dispersive lens element I, increases the overall length of the zoom group only slightly. Moreover, it can simplify the focusing of the zoom lens 10, thereby making its addition to the zoom group still more worthwhile.

The lens powers disclosed herein stem from choosing: to make the dispersive lens components I and III stationary for zooming; to move the two collective lens elements II and IV as a unit; to achieve a zoom ratio of approximately three to one; to limit the distance moved by the collective lens components to a distance approximately half the shortest focal length to achieve a compact lens size; and to certain other quantities familiar to those skilled in the art. The selected powers of the four lens elements correct the focal plane shift, otherwise expected from zooming, at four points in the zoom range and provide a good approximation to correction at the other points.

The choice of lens element powers in the zoom group stems mainly from the need to inhibit focal plane shift during zooming. The choice of lens shape and material stems mainly from the need to minimize monochromatic and chromatic aberrations in the image formed by the zoom group over a useful range of focal lengths.

The materials for the movable positive lens elements are selected in part for their large Abbe numbers (lesser chromatic dispersion). The Abbe number should be as large as practicable, but at least equal to 55. This choice inhibits the degradation of the corrections for chromatic aberrations during zooming. Another consideration is to use a material with a high refractive index. This will reduce the movement (air space change) required for a certain zoom ratio or increase the practical zoom ratio for a specified movement. However, glasses with both a large Abbe number and a high refractive index are not available. Glasses approximating this combination of properties are available, but they are expensive and have deleterious physical and chemical properties. The glasses selected for the species disclosed herein are feasible for use in a moderately priced zoom lens.

The curvatures selected for the surfaces of the lens elements in the zoom group of zoom lens 10 result in a sum for the five Seidel coefficients that remains within an acceptable range as the positive lens elements move. The Seidel coefficients are a measure of the severity of a lens system's monochromatic aberrations (spherical aberration, coma, astigmatism, curvature of field and distortion). Ideally, their sum should equal zero, but in practice a residual value is maintained to balance Gaussian and fifth order aberrations.

The aperture stop 14 is located between the lens elements V and VI in the specie illustrated in FIG. 1. Generally, locating the aperture stop 14 at the center of the lens is desirable. However, it would interfere with the operation of the moving lens elements II and IV. Also, positioning the aperture stop 14 at the center of the zoom lens 10 or between the zoom group and the objective group might lead to more vignetting of the transmitted light, as compared to a location closer to the focal plane 16, as the focal length of the zoom lens 10 changes. Locating the aperture stop 14 close to the focal plane 16 requires too great an increase in the clear aperture (diameter) of the preceding lens components. The consequence of this would be to increase the difficulty of achieving the well-corrected lens and thus to increase the cost of the resulting zoom lens.

The objective group of the zoom lens 10 comprises positive lens element V, negative lens element VI, and positive lens element VII. The three lens elements of the objective group have a net positive power and form a real image of the image formed by the zoom group. The parameters effecting their optical performance are selected to optimize the corrections for aberrations otherwise present in an image for fixed conjugates in the objective group's object and image spaces. The fixed conjugate in the image space is the focal plane 16, and the fixed conjugate in the object space is the location of the real image formed by the zoom group, comprising lens elements I, II, III, and IV.

The first four lens components I, II, III, and IV (the zoom group), form a real image in their own image space that serves as the object for the last three lens components, V, VI, and VII (the objective group). As noted above, the optical compensation of the zooming lens components maintains the image they form stationary. The parameters effecting the quality (the sum of the Seidel aberration coefficients) of the real image they form are selected to produce the best useful image over the range of focal lengths independent of any corrections effected by the last three lens components, V, VI, and VII. One advantage gained from independently correcting the zoom and objective groups is a more pratical tolerance for the assembly of the two lens groups into a complete zoom lens.

Because the present zoom section forms a real image at a finite conjugate, rather than at infinity as do afocal zoom sections, it has one less lens component than standard (afocal) zoom sections. Moreover, the rear objective section need not work as hard to form the final image and to correct the aberrations in the final image because it receives convergent light. Under some circumstances, the simplification permits a reduction of one lens component in the objective section without sacrificing the overall performance of the zoom lens. Any approach that eliminates the need for another lens component promotes the compactness of the resulting zoom lens.

Space is left between the last surface of the objective group and the focal plane for a shutter mechanism and a film advance mechanism.

| Element | $n_d$ | $v$ | Radius | | Thickness | Separation |
|---|---|---|---|---|---|---|
| I | 1.765 | 27.1 | $R_1 =$ | 1.216 | $t_1=0.100$ | $S_1=1.009$ |
|   |       |      | $R_2 =$ | .802  |             |             |
| II | 1.654 | 57.9 | $R_3 =$ | .912  | $t_2=0.182$ | $S_2=0.030$ |
|   |       |      | $R_4 =$ | 6.033 |             |             |
| III | 1.668 | 57.1 | $R_5 =$ | 57.009 | $t_3=0.101$ | $S_3=0.725$ |
|   |       |      | $R_6 =$ | .840  |             |             |
| IV | 1.480 | 70.4 | $R_7 =$ | 70.562 | $t_4=0.138$ | $S_4=0.243$ |
|   |       |      | $R_8 =$ | -1.380 |            |             |
| V | 1.691 | 54.7 | $R_9 =$ | .676  | $t_5=0.318$ | $S_5=0.113$ |
|   |       |      | $R_{10}=$ | -6.418 |           |             |
| VI | 1.753 | 27.6 | $R_{11}=$ | -.604 | $t_6=0.216$ | $S_6=0.020$ |
|   |       |      | $R_{12}=$ | .867  |             |             |
| VII | 1.691 | 54.7 | $R_{13}=$ | -4.953 | $t_7=0.080$ | $S_7=0.736$ |
|   |       |      | $R_{14}=$ | -.510 |             |             |

SPECIE A

Reference should be made to the zoom lens 10, illustrated in FIG. 1, and to its constructional data tubulated in FIG. 2. The constructional data of FIG. 2 is also set forth in the table below. The data is presented in terms of unit focal length, F, where the unit focal length, F, is the local length for the values $S_1$, $S_2$, $S_3$, and $S_4$ set out in the table. Those values in all the following tables are for the wide angle configuration of the zoom lens 10, i.e., the shortest focal length. The design of Specie A and the following species of this invention are based on an F/2.5 aperture at the short focal length. The parameters for the several species optimize the sum of the Seidel aberration coefficients to a practical minimum throughout the zoom lens' range of focal lengths. The aperture stop, as shown in FIG. 1, is located between surfaces $R_{10}$ and $R_{11}$.

In both figures and the table herein, the Roman numerals I, II, III, etc., identify the lens elements in their respective order from the long conjugate (object) side to the short conjugate (film) side; $n_d$ represents the refractive index for a light wavelength of 587.6 nanometers; $v$ is the Abbe dispersion number; $R_1$, $R_2$ ..., represent the radii of the successive refractive surfaces in order from the long conjugate side to the short conjugate side; $t_1$ and $S_1$, etc., represent the thicknesses of the lens elements and air spaces, respectively, from the long conjugate side to the short conjugate side, $t_1$ being the thickness of the first lens element I, and $S_1$ being the thickness of the first air space between lens elements I and II. The air spaces $S_1$, $S_2$, $S_3$, and $S_4$ change during zooming, altering the focal length but maintaining the focal plane in the proper location. To increase the focal length of the zoom lens 10, air spaces $S_1$ and $S_3$ decrease while $S_2$ and $S_4$ increase, all by equal distances. The air spaces illustrated in FIGS. 1 and 2 and set out in the table herein represent the air spaces for the zoom lens' shortest focal length, F, i.e., the position of the lens elements II and IV with respect to the others for the wide angle configuration of the zoom lens.

The positive lens elements of the zoom group, II and IV, have relatively high Abbe numbers. Thus, their movement upsets corrections for chromatic aberrations less than if they had lower abbe numbers. Ideally, lens element II should use a glass with a higher Abbe number, but glasses with higher Abbe numbers have lower refractive indices. A lesser index yields a lens with less power and the end result is an increase in the zoom lens' overall length (OAL) to get the same zoom ratio. The refracting power of the zoom group elements is distributed, as much as practicable, among the several elements to minimize the lateral displacement of light rays refracted through the system, particularly at their interception with the objective group at surface $R_9$. The overall length, $R_1$ to $R_{14}$, of Specie A is 3.27F.

In general, the highest practical refractive indices are selected for the stationary negative elements of the zoom group and the highest practical Abbe numbers are selected for the movable positive elements of the zoom group.

Less strongly curved refracting surfaces exacerbate less the contribution of each surface to the total aberrations (sum of the Seidel coefficients) of the zoom lens. Thus, a consideration in affecting the concepts disclosed herein is to utilize higher refractive indices or extra surfaces rather than strongly curved surfaces to achieve a specific dioptric power.

Commonly, in the objective group of a zoom lens using the concepts disclosed herein, the negative middle lens element has substantially the same or a somewhat higher refractive index than the surrounding positive lens elements. However, the negative middle element has a much lower Abbe number than the positive lens elements of the objective group. Also, because the air spaces in the objective group are fixed, stronger curvatures are practicable on its refracting surfaces since the balance between the curvatures and the other parameters that minimize the objective group's Seidel sum does not have to be compromised for use over a range of air spaces.

In light of the foregoing discussion, it should be understood that the specific lens designs discussed above in detail are just preferred embodiments of the invention. Since changes may be made in the optically compensated zoom lenses described above without departing from the scope of the invention herein involved, it is intended that all matter contained in the above description or shown in the accompanying drawing shall be interpreted as illustrative of the broad principles of this invention and not limiting on its scope.

What is claimed is:

1. A zoom lens the optical portion of which consists, in an axially aligned arrangement from the long conjugate side to the short conjugate side, of:
   a negative lens element having a convex surface toward said long conjugate;
   a positive second lens element having a strongly curved surface toward said long conjugate and a weaker surface toward said short conjugate;
   a negative third lens element with a weakly curved surface toward said long conjugate and a stronger surface toward said short conjugate;
   a positive fourth lens element with a weakly curved surface toward said long conjugate and a stronger surface toward said short conjugate;
   a positive fifth lens element having a strong curvature toward said long conjugate and a weaker surface toward said short conjugate;
   a negative sixth lens element; and
   a positive seventh lens element with a weakly curved surface toward said long conjugate and a stronger surface toward said short conjugate.

2. The zoom lens described in claim 1, the mechanical portion of which includes; means for permitting said second and fourth lens elements to move axially between said first and fifth lens elements without changing the separation between said second and fourth lens elements and without changing the separation between said first and third lens elements.

3. The zoom lens described in claim 1, wherein said first, second, third, and fourth lens elements function as a zoom group to change the focal length of said zoom lens and said fifth, sixth, and seventh lens elements function as an objective group, the lens powers of said zoom group selected so light emerging therefrom will be refracted to a focus at a finite distance behind said zoom group, and the powers and shapes of said objective group selected to balance the aberrations in said focused light entering said objective group.

4. The zoom lens described in claim 1, wherein the movable positive lens elements of the zoom group have Abbe dispersion numbers greater than 55.

5. The zoom lens described in claim 1, wherein the overall length of said zoom lens from the first refracting surface to the last refracting surface is less than four times its shortest focal length.

6. The zoom lens described in claim 1 wherein said positive second lens element and said positive fourth lens element are movable conjointly so as to substantially change the effective focal length of said zoom lens and said negative first lens element is movable independently of the other said lens elements to focus said zoom lens.

7. A zoom lens the optical portion of which consists, in an axially aligned arrangement from the long conjugate side to the short conjugate side, of:
   a meniscus negative first lens element having its convex side toward said long conjugate;
   a positive second lens element having a convex surface toward said long conjugate and a weaker surface toward said short conjugate;
   a negative third lens element with its weaker surface toward said long conjugate and a concave surface toward said short conjugate;
   a positive fourth lens element with its weaker surface toward said long conjugate and a convex surface toward said short conjugate;
   a positive fifth lens element having a strong surface toward said long conjugate and a weaker surface toward said short conjugate;
   a biconcave negative sixth lens element and
   a positive seventh lens element with its weaker surface toward said long conjugate and a convex surface toward said short conjugate, said optical portion having an overall length from its first refracting surface to its last refracting surface less than four times its shortest focal length.

8. A zoom lens for refracting an image of a subject located in front of it to a focal plane at its rear, the optical portion of which consists of:
- a negative lens element, stationary with respect to said focal plane;
- two positive lens elements, one disposed on each side of said negative lens element along a common axis therewith and both having their stronger surfaces facing in opposite directions, said two positive lens elements movable axially with respect to said negative lens element;
- a meniscus negative lens element disposed on said axis forward of said two positive lens elements;
- objective lens means consisting of three lens elements disposed on said axis rearward of said two positive lens elements, said two positive lens elements movable conjointly so as to substantially change the focal length of said zoom lens without shifting said image from said focal plane, said zoom lens having an overall length from its first refracting surface to its last refracting surface less than four times its shortest focal length.

9. The zoom lens described in claim 8, wherein said negative lens elements and said two positive lens elements coact to form a real image at a finite conjugate to the rear of said zoom lens and said objective triplet refracts said real image to a focus at said focal plane.

10. The zoom lens described in claim 8, wherein said three lens elements of said objective lens means are:
- a positive lens element with a substantially stronger curvature on its forward refracting surface than on its rearward refracting surface;
- a biconcave negative lens element with a weaker curvature on its forward refracting surface than on its rearward refracting surface; and
- a last positive lens element with a weak curvature on its forward refracting surface, said lens elements of said objective lens means arranged in the foregoing order with said last positive lens element closest to said focal plane.

11. The zoom lens described in claim 8, wherein said two positive lens elements are:
- a positive lens element on the forward side of said negative lens element having a convexly curved refracting surface toward the front of said zoom lens and a weak refracting surface toward the rear of said zoom lens; and
- a positive lens element on the rearward side of said negative lens element having a convexly curved refracting surface toward the rear of said zoom lens and a weakly curved refracting surface toward the front of said zoom lens.

12. The zoom lens described in claim 8, the mechanical portion of which includes: means for retaining a predetermined spacing arrangement between said two positive lens elements and for moving them as a unit relative to the other lens elements to change the focal length of said zoom lens.

13. The zoom lens described in claim 8, wherein said movable plurality of positive lens elements have Abbe dispersion numbers greater than 55.

14. An optically compensated zoom objective lens having the design parameters for a unit focal length, F, represented in the following table:

| Element | $n_d$ | $v$ | Radius | | Thickness | Separation |
|---|---|---|---|---|---|---|
| I | 1.765 | 27.1 | $R_1 =$ | 1.216 | $t_1=0.100$ | $S_1=1.009$ |
|   |       |      | $R_2 =$ | .802 |             |             |
| II | 1.654 | 57.9 | $R_3 =$ | .912 | $t_2=0.182$ | $S_2=0.030$ |
|   |       |      | $R_4 =$ | 6.033 |             |             |
| III | 1.668 | 57.1 | $R_5 =$ | 57.009 | $t_3=0.101$ | $S_3=0.725$ |
|   |       |      | $R_6 =$ | .840 |             |             |
| IV | 1.480 | 70.4 | $R_7 =$ | 70.562 | $t_4=0.138$ | $S_4=0.243$ |
|   |       |      | $R_8 =$ | −1.380 |             |             |
| V | 1.691 | 54.7 | $R_9 =$ | .676 | $t_5=0.318$ | $S_5=0.113$ |
|   |       |      | $R_{10}=$ | −6.418 |             |             |
| VI | 1.753 | 27.6 | $R_{11}=$ | −.604 | $t_6=0.216$ | $S_6=0.020$ |
|   |       |      | $R_{12}=$ | .867 |             |             |
| VII | 1.691 | 54.7 | $R_{13}=$ | −4.953 | $t_7=0.080$ | $S_7=0.736$ |
|   |       |      | $R_{14}=$ | −.510 |             |             | wherein F is the shortest focal length for the zoom objective lens, i.e., that for which the air spaces $S_1$, $S_3$, $S_4$, and $S_5$ are given; Roman numerals I, II . . . , identify the respective lens elements from the long conjugate side to the short conjugate side; $n_d$ is the refractive index for a light wavelength of 587.6 nanometers; $v$ is the Abbe dispersion number; $R_1$, $R_2$ . . . , represent the radii of the successive refractive surfaces from the long conjugate side to the short conjugate side; $t$ and $S$ represent thickness of lens elements and air spaces, respectively, from the long conjugate side to the short conjugate side, the sum of $S_2 + t_3 + S_3$ being constant with $S_1$ and $S_4$ being variable in equal amounts to change the focal length of this zoom lens and to maintain the location of its focal plane.

* * * * *